Dec. 22, 1970   H. L. HAYES   3,549,207

SAFETY BRAKE APPARATUS

Filed Feb. 24, 1969   2 Sheets-Sheet 1

INVENTOR.
Henry L. Hayes
BY
Barnard, McGlynn & Reising
ATTORNEYS

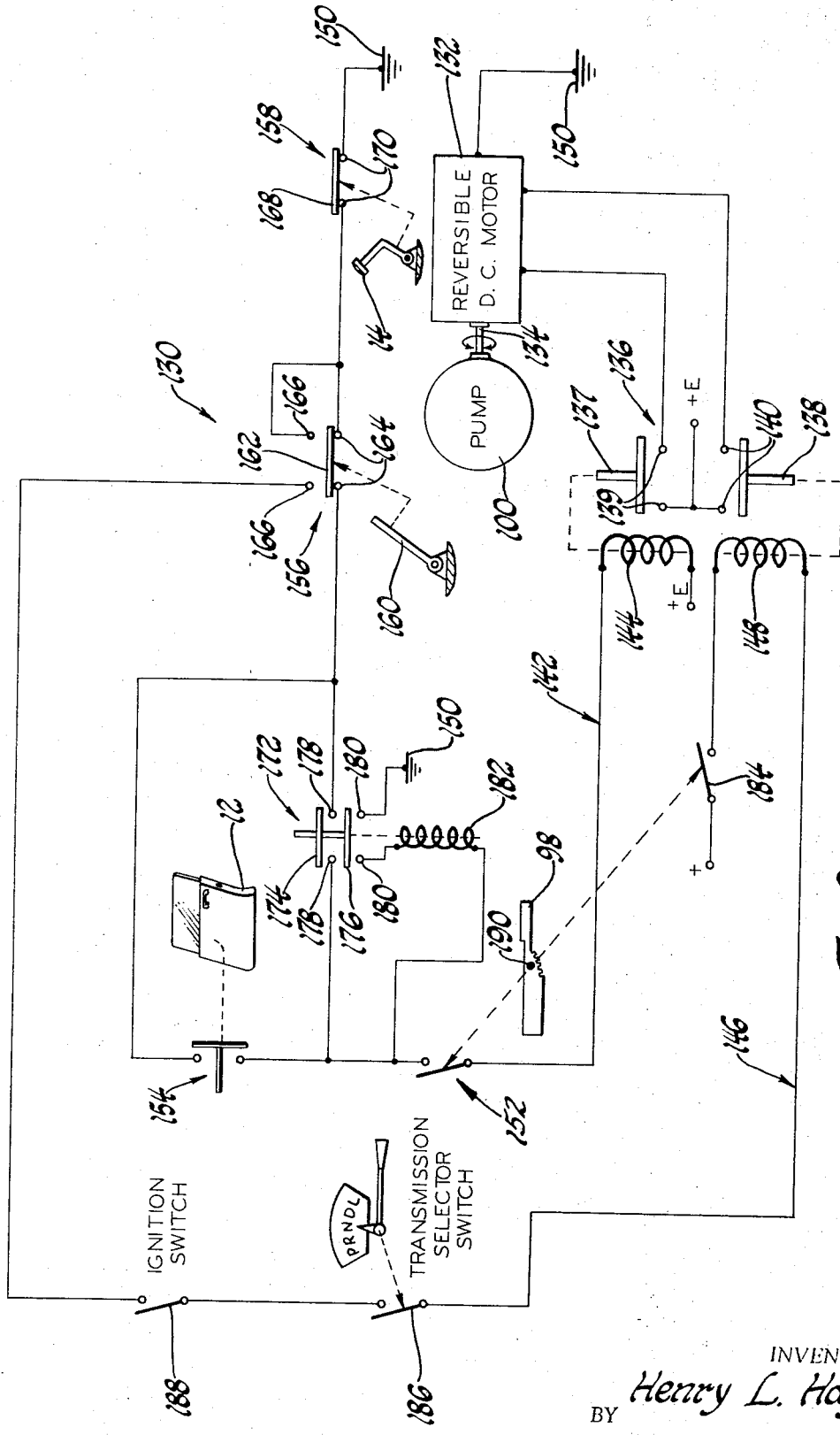

United States Patent Office 3,549,207
Patented Dec. 22, 1970

---

3,549,207
SAFETY BRAKE APPARATUS
Henry L. Hayes, 496 E. Baker, Clawson, Mich. 48017
Filed Feb. 24, 1969, Ser. No. 801,618
Int. Cl. B60t 7/16, 13/16
U.S. Cl. 303—6.1                           18 Claims

ABSTRACT OF THE DISCLOSURE

Apparatus for applying the hydraulic brakes of a vehicle upon opening the door and releasing the brake when the vehicle is conditioned for normal driving. In one embodiment, door opening energizes a pump motor operating an actuator mechanism which displaces a piston to disable the normal hydraulic brake system and to pressurize the brake lines. The brake system is restored to normal operation when the vehicle is conditioned for driving by operator actuation of the ignition switch, transmission selector lever, and the accelerator pedal. Manual operation of the system is also permitted.

---

Figure 1:
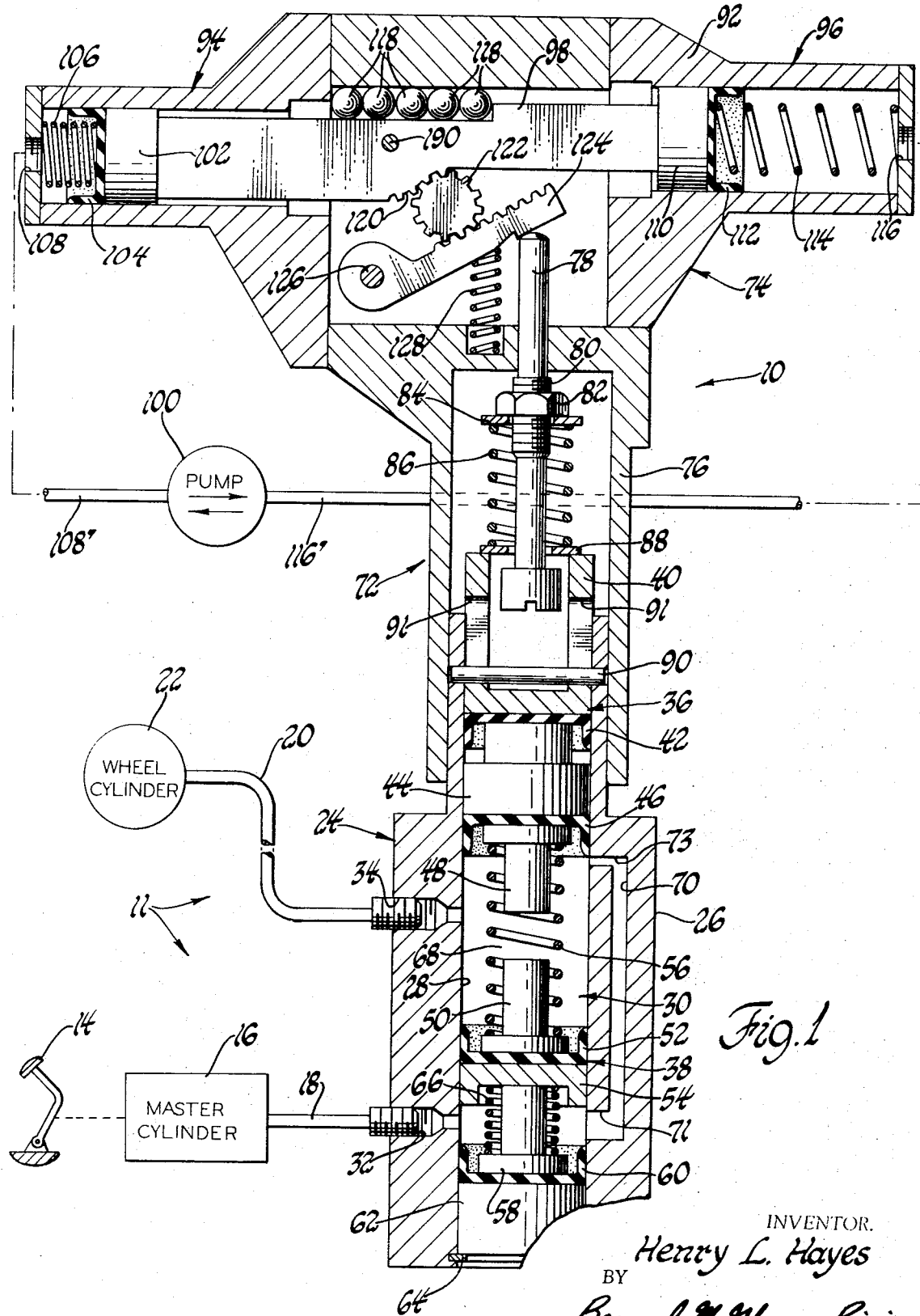

This invention relates to vehicle hydraulic brake systems and more particularly to a system and components of a system for automatically applying the vehicle brakes when the operator exits from the vehicle.

In accordance with the subject invention, the brake or brakes of a fluid brake system are applied to prevent accidental vehicle movement when the operator opens the door to depart from the vehicle. In general, this is accomplished by providing means operatively connected into the fluid brake system for generating brake fluid pressure to apply the brakes in response to the opening of a vehicle door.

In a specific system employing the invention, brake pressure is automatically applied upon opening the vehicle door and is automatically released when the vehicle is again conditioned for normal driving. In general, this is accomplished by means of electrical control circuitry operating together with the auxiliary brake pressurizing apparatus to energize first electrical circuit means when a door is opened thereby to pressurize in an auxiliary fashion the vehicle brake line. Additionally, a second circuit means is energized when, for example, the ignition switch is closed, the transmission selector lever is moved to a "drive" position and the accelerator pedal is depressed thereby to relieve the auxiliary-generated brake pressure and enable the normal brake system for the usual selective operation.

In a preferred form, the invention includes an actuator mechanism which, upon command, displaces a rack cam to pivot an arm to displace a piston for generating fluid pressure in the brake system to apply the vehicle brake or brakes. The actuator mechanism may, for example, be combined with hydraulic apparatus responsive to the displacement of the piston to disable the normal brake system by closing normal communication between the master cylinder and the wheel cylinders of a vehicle and to auxiliarily generate brake fluid pressure to apply the brake or brakes.

Further features and advantages of the invention will become apparent upon reading the following specification which is to be taken with the accompanying drawing of which:

FIG. 1 is a cross sectional view of an illustrative embodiment of the invention; and FIG. 2 is a schematic circuit diagram of an electrical control circuit for operating the apparatus of FIG. 1.

Referring to the figures there is shown an auxiliary brake apparatus 10 for automatically applying the brakes of an automotive vehicle (not shown) in response to the opening of a vehicle door 12. As shown in FIG. 1, the vehicle of which door 12 is a part includes an hydraulic brake system 11 having a brake pedal 14 and a fluid pressurizing master cylinder 16. Depression of pedal 14 causes master cylinder 16 to apply pressure to fluid contained in a line having portions 18 and 20 terminally connected to a conventional wheel cylinder 22 which is to be taken as representative of a conventional vehicle brake whether of the drum or disc type. Obviously, line 20 may include plural branches to operate a plurality of brakes.

The auxiliary brake apparatus 10 of FIG. 1 is operatively connected into the fluid circuit of system 11 in such a manner as to permit normal operation thereof under normal driving conditions. However, cooperation between the circuitry of FIG. 2 and the apparatus 10 of FIG. 1 causes the apparatus 10 to respond to the opening of door 12 to disable brake system 11 and auxiliary pressurize line 20 to actuate wheel cylinder 22.

To accomplish this function, apparatus 10 includes a cylinder 24 having a hollow body 26 which is bored out to define a cylindrical interior 28. A piston generally designated at 30 is disposed within the interior 28 for displacement relative to the body 26 along a longitudinal axis. An inlet port 32 is bored through the body 26 into the interior 28. Port 32 is threaded to receive line portion 18. An outlet port 34 is bored through body 26 to interior 28 and is spaced longitudinally from port 32. Port 34 is threaded to receive line portion 20. Interior 28 as well as the fluid circuit portions 18 and 20 and master cylinder 16 are filled with an hydraulic brake fluid.

Piston 30 is generally divided into an upper piston assembly 36 and a lower piston assembly 38. Upper piston assembly 36 includes a coaxial combination of a displaceable member 40, a sealing cup 42 having an annular periphery which faces away from displaceable member 40, a locking plug 44 of generally cylindrical configuration and a sealing cup 46 having an annular periphery which faces away from plug 44. The lower piston assembly 38 includes the coaxial combination of a sealing cup 52 and an annular plug 54. The upper and lower piston assemblies 36 and 38, respectively, are resiliently interconnected by means of a pair of stops 48 and 50 having enlarged diameter portions which bear against the inner surfaces of sealing cups 46 and 52, respectively. The stops 48 and 50 are urged axially apart by a spring 56 which engages each of the stops and bears against the enlarged diameter portions thereof. The lower end of cylinder 24, as seen in FIG. 1, is sealed by the coaxial combination of a stop 58, a sealing cup 60 having the inner surface thereof in bearing relation with stop 58, and a plug 62 which is maintained in position within the cylinder body 26 by means of a snap-in retaining ring 64. Plug 54 and stop 58 are constantly urged apart by a spring 66 which surrounds the stop 58 and bears against the mutually facing surfaces of plug 54 and the enlarged diameter portion of stop 58.

The axially spaced upper and lower piston assemblies 36 and 38 define within the interior 28 an auxiliary pressurizing chamber 68, the volume of which depends upon the axial spacing of cups 46 and 52. Chamber 68 communicates directly with outlet port 34 at all times. During normal operation of the hydraulic brake system 11, chamber 68 also communicates with inlet port 32 through an axial passage 70 formed in the body 26 of cylinder 24. Passage 70 has a radially oriented inlet end 71 diametrically opposite the inlet port 32 and an outlet end 73 which communicates with the auxiliary pressurizing chamber 68 as shown. The outlet end 73 is normally open to the auxiliary pressurizing chamber 68. However, upon engagement of the FIG. 1 apparatus, the upper piston assembly 36 is displaced axially downwardly as seen in the drawings such that sealing cup 46 blocks off the outlet end 73 of passage 70 preventing fluid flow between fluid circuit portions 18 and 20 thus disabling the normal hydraulic braking system 11. Under these conditions, hydraulic fluid pressure is applied to wheel cylinder 22 as a result of axial displacement of upper piston assembly 36 toward lower piston assembly 38.

Apparatus 10 further includes an accumulator 72 and an hydraulically controlled actuator 74. The accumulator 72 comprises a substantially cylindrical body portion 76 which is adapted to telescopically engage the body portion 26 of cylinder 24. Accumulator body 76 is hollowed out to receive therein a plunger 78 adapted for displacement along the longitudinal axis of the FIG. 1 assembly. Plunger 78 includes a threaded portion 80 approximately midway along its length. The threaded portion 80 carries a nut 82 which controls the axial position of a washer 84 and thus the compression force applied to a spring 86 which seats at one end against a washer 84 and at the other end against a similar washer 88. Washer 88 is disposed against the upper end of the displaceable member 40 of cylinder 24. Accordingly, a downward displacement of plunger 78 from the position shown in FIG. 1 transmits a downwardly directed force through spring 86 to the displaceable member 40 thus tending to compress spring 56 and urge the upper and lower piston assemblies 36 and 38 toward one another. This has the effect of closing the outlet end of passage 70 and decreasing the volume of auxiliary chamber 68.

The axial displacement of member 40 is limited by means of a mechanical stop pin 90 disposed transverse to the longitudinal axis of the FIG. 1 apparatus. Pin 90 extends through a hole in the cylinder body 26 and through elongated holes 91 in the walls of displaceable member 40 thus permitting the displaceable member 40 an axial displacement corresponding to the axial length of the holes 91 in the member 40.

Actuator 74 includes a body portion 92 which may be suitably connected to the accumulator body portion 76 by welding. Body portion 92 contains a pair of hydraulic cylinders 94 and 96 having normally horizontal axes perpendicular to the longitudinal axis of the cylinder 24 and the accumulator 72. The hydraulic cylinders 94 and 96 control the horizontal position of a rack cam 98 in response to the operation of a reversible pump 100 thereby to control the vertical displacement of plunger 78 as is hereinafter described.

Cylinder 94 comprises a horizontally displaceable piston 102 bearing against one end of the rack cam 98, a sealing cup 104 and a spring 106 which urges the cup 104 and piston 102 toward the rack cam 98. The actuator body portion 92 is provided with a threaded port 108 which is connected to the outlet line 108' of pump 100.

Cylinder 96 similarly includes a horizontally displaceable piston 110 bearing against the other end of rack cam 98, a sealing cup 112 and a spring 114 which urges the cup 112 and the piston 110 toward the rack cam 98. The cylinder 98 is provided with a threaded port 116 which is connected to the outlet line 116' of pump 100.

As is apparent in FIG. 1, operation of the pump 100 to move fluid away from cylinder 96 and into cylinder 94 is effective to displace the rack cam 98 from left to right as shown in FIG. 1. Similarly, reverse operation of pump 100 transfers fluid out of cylinder 94 and back into cylinder 96 moving cam rack 98 from right to left as shown in FIG. 1.

The displacement of cam rack 98 operates to transfer a longitudinally axial displacement to plunger 76 through the combination of an arcuate rack 120 formed on the lower edge of rack cam 98, a gear 122 and a rack arm 124 which is pivotally connected to body portion 92 at 126. Gear 122 floats between rack cam 98 and the rack arm 124 and is maintained in the proper position by means of a spring 128 which urges rack arm 124 in the counterclockwise direction about pivot 126 as shown in FIG. 1. The rack arm 124 bears against the top surface of plunger 78 such that displacement of the rack cam 98 toward the right from the position shown in FIG. 1 rotates gear 122 and rack arm 124 in the clockwise direction urging plunger 78 axially downwardly. Displacement of rack cam 98 to the left permits spring 128 to rotate arm 124 counterclockwise about pivot 126 releasing plunger 78 and permitting it to rise under the combined force of springs 66, 56, and 86. Since the aforementioned springs place a net upward force on rack cam 98, balls 118 are disposed in bearing relation between cam 98 and the body portion 92 of actuator 74. The balls 118 thus permit the transverse displacement of cam 98 produced by cylinder 94 and 96.

It is apparent that means other than the hydraulic cylinders 94 and 96 may be employed to displace rack cam 98 in a reversible fashion. For example, the output shaft of a small reversible electric motor may be connected through a gear set to a second rack on cam 98 in such a manner as to drive cam 98 to the right or left depending on the direction of motor rotation.

Referring now to FIG. 2, electrical circuitry 130 is shown for suitably controlling the auxiliary brake apparatus 10 of FIG. 1. Circuit 130 includes a reversible DC motor 132 having a rotatable output shaft 134 connected to operate the reversible pump 100 which in turn operates cylinders 94 and 96 to displace the rack cam 98 of FIG. 2. The direction of rotation of output shaft 134 is determined by a relay-controlled switch set 136. Switch set 136 includes armatures 137 and 138 carrying contact plates which are adapted to complete electrical current paths across terminal sets 139 and 140, respectively. Terminal set 139 and armature 137 form one relay controlled switch to control the application of current from a source +E to an armature of motor 132 to rotate the motor in one direction. Terminal set 140 and armature 138 form another relay-controlled switch to control the application of current from source +E to an armature of motor 132 to rotate the motor in the reverse direction. Armatures 137 and 138 are normally disengaged from the terminal sets 139 and 140 such that both switches in set 136 are open and the motor 132 is at rest. Contact between armature 137 and terminals 139 is produced by energization of a first circuit 142 which includes a coil 144. Current flow through coil 144 produces a magnetic force driving armature in a direction to engage terminals 139 causing motor 132 to rotate in a direction which pumps fluid from cylinder 96 of FIG. 1 to cylinder 94, driving cam 98 to the right and depressing plunger 78. Contact between armature 138 and terminals 140 is produced by energization of a second circuit 146 which includes a coil 148. Current flow in coil 148 engages armature 138 with terminals 140 driving motor 132 in the opposite direction to pump fluid from cylinder 94 of FIG. 1 to cylinder 96, returning cam 98 to the left-hand position and permitting plunger 78 to rise.

Circuit 142 includes coil 144, a limit switch 152, a door-operated switch 154, an acceleration-operated switch 156 and a brake-operated switch 158, all of which are connected in series between the source +E and ground 150. Limit switch 152 is arranged with respect to a pin 190 carried by cam 98 such that switch 152 is closed to allow current flow therethrough when rack cam 98 is in the left-hand position of FIG. 1, and opened when the cam 98 reaches the right-hand position. Door operated switch 154 is suitably arranged to be opened when the door 12 is closed and vice versa. Switch 156 is suitably connected to an accelerator pedal 160 such that a movable contact 162 engages stationary contact terminals 164 whenever pedal 160 is in the undepressed condition. However, when pedal 160 is depressed, movable contact 162 is moved into engagement with a second set of contact terminals 166 in circuit 146 for purposes to be described. Switch 158 is suitably connected to the brake pedal 14 such that a movable contact 168 engages fixed contact terminals 170 when the brake pedal 14 is in the undepressed position. However, when brake pedal 14 is depressed contact 168 is disengaged from contact terminals 170.

Circuit 142 also includes a manually operable pushbutton switch 172 for energizing circuit 142 by operator control. Switch 172 includes two mechanically connected armatures 174 and 176 adapted to engage contact terminal pairs 178 and 180, respectively. Contact terminals 178 are connected electrically in parallel with switch 154 such that electrical contact between armature 174 and terminals 178 performs the same function as is performed by closing switch 154. Terminals 180 are connected in series between the source +E and a holding coil 182 which is connected to ground 150 as shown. Upon depression of pushbutton switch 172 to engage the armatures 174 and 176 with their associated contact terminals, a circuit is completed through coil 182 holding the armatures 174 and 176 in the depressed position. When the rack cam 98 is fully displaced to the right in FIG. 1, pin 190 opens limit switch 152 breaking the holding circuit through coil 182 and allowing the armatures 174 and 176 to disengage from terminals 178 and 180, respectively.

Circuit 146 includes a limit switch 184, coil 148, a transmission selector switch 186, an ignition switch 188, accelerator-controlled switch 156, and the brake-controlled switch 158, all of which are connected in series between source +E and ground 150. Limit switch 184 is mechanically controlled by the pin 190 to assume an electrically closed condition whenever the rack cam 98 is fully displaced to the right in the apparatus 10 of FIG. 1. Accordingly, limit switch 184 operates in a complementary fashion with switch 152. Transmission selector switch 186 may be suitably interconnected with the transmission selector lever 192 such that switch 186 is closed whenever the selector lever is placed in a drive position; that is, any position other than "Park" or "Neutral." As previously indicated, switch 156 is arranged such that the movable contact 162 is moved into engagement with terminals 166 when the accelerator pedal 160 is depressed. Brake-controlled switch 158 is closed as shown when pedal 14 is undepressed. Accordingly, whenever the rack cam 98 is in the right-hand position of the FIG. 1 apparatus such that switch 184 is closed, the transmission selector lever 192 is moved to a drive position to close switch 186, ignition switch 188 is closed and the accelerator pedal 160 is depressed to engage elements 162 and 166, circuit 146 is energized to direct current through coil 146 to engage control relay armature 138 with terminals 148. This energizes DC motor 132 to rotate pump 100 in a direction to displace hydraulic fluid from cylinder 94 back to cylinder 96. This displaces rack cam 98 to the left in the FIG. 1 apparatus allowing plunger 78 to rise. When the rack cam 98 reaches the left-hand position, limit switch 184 is again opened deenergizing coil 148 and opening terminals 140 to stop motor 132.

A previously described, output shaft 134 of motor 132 may be connected through a suitable gear set to mechanically displace rack cam 98. In such a case, hydraulic pump 100 and cylinders 94 and 96 are eliminated and the above-described mechanical equivalent substituted therefor.

OPERATION

Discussing the operation of the embodiment described herein it will first be assumed that the appartus 10 is in the condition shown in FIG. 1 with rack cam 98 fully displaced to the left and plunger 78 in the undepressed position. In this condition, passage 70 is in open communication between the fluid circuit portions 18 and 20 thus permitting normal brake operation. Spring 56 urges upper and lower piston assemblies 36 and 38 fully apart such that depression of brake pedal 14 to energize master cylinder 16 immediately applies pressure through the hydraulic circuit including passage 70 and chamber 68 to the wheel cylinder 22. With rack cam 98 in the left-hand position, pin 190 operates to close limit switch 152 and open limit switch 184. Switch 154 is open so that neither circuit 142 nor 146 is energized to operate motor 132.

When the operator of the vehicle to which the apparatus is applied exists from the vehicle by opening door 12, switch 154 is closed along with switches 156 and 158 thus completing circuit 142 to energize coil 144. Current flowing in coil 144 engages armature 137 with terminals 139 energizing motor 132 and rotating pump 100 to displace hydraulic fluid from cylinder 96 to cylinder 94. Piston 102 is urged to the right, driving rack cam 98 to the right and rotating gear 122 in a clockwise direction to travel up rack arm 124. Rack arm 124 pivots about 126 against the bias of spring 128 to depress plunger 78. This compresses spring 86 to an extent determined by the position of nut 82 and displaces member 40 downwardly within cylinder 24. Spring 56 is depressed allowing cup 46 to seal off the outlet end 73 of passage 70 disabling the brake system 11, downward displacement of cup 46 decreases the volume of chamber 68 and applies pressure to fluid in the circuit portion 20 thus actuating wheel cylinder 22 to apply a brake. Nut 82 is preferably adjusted such that the pressure applied to the brake or brakes represented by wheel cylinder 22 is less than that which would normally lock the associated wheels but enough to apply a substantial braking force. Master cylinder 16 is protected against a destructive reverse pressure by the action of cup 46 closing passage 70.

When rack cam 98 is fully displaced to the right in the FIG. 1 apparatus, pin 190 opens limit switch 152 and closes limit switch 184. Opening switch 152 deenergizes coil 144 to open terminals 139 and stop the motor 132. The time required for the complete operation of apparatus 10 is on the order of one second or less, thus permitting engagement of the apparatus 10 will within the time normally required for an occupant to exit by way of door 12. The entire operation of engaging apparatus 10 described above may also be carried out by depression of manual pushbutton switch 172. Accordingly, it is possible for the driver of the vehicle to apply the brakes manually. It will also be observed that the system described herein will also advise the driver that a door is ajar by applying the brakes to the degree determined by axial position of nut 82.

When the driver returns of the vehicle through door 12, the apparatus 10 remains in the engaged condition until the vehicle is suitably preparaed for normal driving. In normal operation the ignition switch 188 is closed to start the vehicle engine and the transmission selector lever 192 is moved to a drive position thus closing switch 186. Depressing accelerator pedal 160 engages movable contact 162 with stationary contact terminals 166 which, as long as brake pedals 14 is undepressed, energizes circuits 146 directing current through coil 148. This moves armature 138 into engagement with terminals 140 energizing motor 132 in the reverse direction. Motor 132 drives pump 100 in a direction to displace hydraulic fluid from cylinder 94 to cylinder 96. Piston 110 urges rack cam 98 to the left of the FIG. 1 apparatus 10 rotating gear 122 in a counterclockwise direction, allowing rack arm 124 to rotate in a counterclockwise direction about pivot 126 and permitting the plunger 78 to rise. Spring 56 correspondingly urges the upper and lower piston assemblies 36 and 38 apart permitting the entire combination of cup 46, plug 44, and member 40 to displace upwardly relative to cylinder 24. Displacement in the upward direction of cup 46 increases the volume of chamber 68 relieving fluid pressure in circuit portion 20 thus releasing the brake or brakes as represented by wheel cylinder 22. At the same time, upward displacement of cup 46 opens the outlet end 73 of passage 70 restoring the brake system 11 to normal operation. As the rack arm 98 is fully displaced to the left of the FIG. 1 apparatus, pin 190 again opens limit switch 184 and closes limit switch 152 to prepare the apparatus for reengagement. Opening limit switch 184 interrupts current flow in coil 148 and stops DC motor 132.

It will be observed that the brake-controlled switch 158, being common to both circuits 142 and 146 will not permit apparatus 10 to be either engaged or disengaged as long as pedal 14 is depressed. Similarly, switch 156 prevents the apparatus 10 from engaging as long as the accelerator pedal 160 is depressed and further prevents the apparatus 10 from disengaging until the pedal 160 is depressed.

It will be obvious that the entire system may be designed so that various combinations of switches and switch control functions are employed as suits the individual user. Moreover, it may be desirable to employ the system to generate brake pressure through the master cylinder 16 directly rather than the cylinder 24 by suitable connection of plunger 78 to the master cylinder piston. Since such variations as well as other variations from the illustrated embodiment will be apparent to those skilled in the art, it is to be undesstood that the foregoing description is illustrative in nature and is not to be construed in a limiting sense.

The embodiments of the invention in which an exclusive property or privilege is claimed are defined as follows:

1. Auxiliary brake apparatus for a vehicle having a door, a fluid brake system including at least one selectively operated pressurizing cylinder, a fluid circuit operatively connected to the pressurizing cylinder and a wheel cylinder operated by fluid pressure in the circuit to apply a brake; the apparatus comprising: first means in the fluid circuit between the pressurizing cylinder and the wheel cylinder operable to disable the fluid communication between the pressurizing cylinder and the wheel cylinder and auxiliarily pressurize the portion of the fluid circuit between the first means and the wheel cylinder to apply the brake, and second means responsive to opening the door for operating the first means.

2. Auxiliary brake apparatus as defined in claim 1 wherein the first means includes a cylinder body having a hollow interior, means connecting the fluid circuit through the interior and a piston displaceable within the interior to vary the volume thereof in the fluid circuit.

3. Auxiliary brake apparatus as defined in claim 2 wherein the cylinder body has an inlet port communicating the interior with the pressurizing means and an outlet port communicating the interior with the wheel cylinder, the piston being displaceable from a first position wherein the inlet and outlet ports are in communication to a second position preventing communication between the inlet and outlet ports.

4. Auxiliary brake apparatus as defined in claim 3 including spring means biasing the piston to the first position.

5. Auxiliary brake apparatus as defined in claim 4 wherein the inlet and outlet ports are axially spaced longitudinally of the cylinder body, the piston includes a relatively fixed lower portion and a relatively displaceable upper portion, the upper and lower portions being axially spaced apart to define a chamber within said interior the volume of which varies in accordance with the axial spacing between the upper and lower portions, and a passage in the cylinder body communicating the inlet port with the chamber, the upper piston portion being axially displaceable to close the passage when in said second position.

6. Auxiliary brake apparatus as defined in claim 5 wherein the first means includes an accumulator having a displaceable plunger connected to the upper portion of the piston and an hydraulic actuator for displacing the plunger thereby to displace the upper portion relative to the lower portion of the piston.

7. Auxiliary brake apparatus as defined in claim 6 wherein the accumulator includes a hollow cylindrical body, the plunger being disposed within the body for axial displacement relative thereto, and means biasing the plunger to an undisplaced position thereby to permit the upper piston portion to assume said first position.

8. Auxiliary brake apparatus as defined in claim 7 wherein the means biasing the plunger is adjustable.

9. Auxiliary brake apparatus as defined in claim 7 wherein the hydraulic actuator includes a displaceable cam, means for reversibly displacing the cam between first and second positions, and means operatively connecting the cam to the plunger for transferring displacement of the cam to displacement of the plunger.

10. Auxiliary brake apparatus as defined in claim 9 wherein said means for reversibly displacing the cam includes a reversible electric motor and first electrical circuit means for energizing the motor in one direction whenever the door is opened.

11. Auxiliary brake apparatus as defined in claim 10 including second electrical circuit means for energizing the motor in the opposite direction when the vehicle is conditioned for normal operation.

12. Auxiliary brake apparatus as defined in claim 3 wherein the second means includes a source of electrical energy, a motor energizable by the source to operate the hydraulic means, and a first switch operatively connected to close when the door is opened and electrically connected between the source and the motor to displace the piston from the first to the second position.

13. Auxiliary brake apparatus as defined in claim 11 wherein the second means includes means for deenergizing the motor when the piston reaches the second position.

14. Auxiliary brake apparatus for a vehicle having a door, an hydraulic system including selectively operated pressurizing means, a fluid circuit operatively connected to the pressurizing means, and a wheel cylinder operated by fluid pressure in the circuit to apply a brake; the apparatus comprising: an hydraulic cylinder having a hollow interior in the fluid circuit and a piston disposed within the interior to define a variable volume chamber, the piston being displaceable within the interior from a first position to a second position for auxiliarily pressurizing the fluid circuit to apply the brake, means for reversibly displacing the piston between the first and second positions including a reversible electric motor, a cam member, means responsive to operation of the motor to reversibly displace the cam member between first and second positions corresponding to the first and second positions of the piston, respectively, means connecting the cam member to the piston for transferring displacement of the cam member to displacement of the piston, first circuit means for rotating the motor in one direction in response to the opening of the door thereby to displace the piston to the first position, and second ciriuit means for rotating the motor in the other direction upon conditioning the vehicle for normal driving thereby to displace the piston from the second to the first position.

15. Auxiliary brake apparatus as defined in claim 14 wherein the first circuit means includes a source of electrical energy, a relay controlled switch for selectively connecting the source to the motor and including a coil, an energization path for the coil including a door switch connected in series with the coil and operatively associated with the door to close when the door is opened.

16. Auxiliary brake apparatus as defined in claim 15 including a limit switch connected in series with the door switch and the coil to open when the cam member reaches the second position.

17. Auxiliary brake apparatus as defined in claim 14 wherein the second circuit means includes a source of electrical energy, a second relay controlled switch for connecting the source to the motor and including a coil, and an energization path for the coil including an ignition switch connected in series with the coil.

18. Auxiliary brake apparatus as defined in claim 17 wherein the second circuit means includes a limit switch connected in series with the ignition switch to open when the cam member reaches the first position.

References Cited

UNITED STATES PATENTS

| 2,318,610 | 5/1943 | Hyatt et al. | 303—6.1 |
| 2,683,633 | 7/1954 | Schultz | 303—6.1 |
| 2,720,426 | 10/1955 | Karp et al. | 303—6.1 |
| 2,914,358 | 11/1959 | Schjolin | 303—6.1 |

MILTON BUCHLER, Primary Examiner

J. J. McLAUGHLIN, JR., Assistant Examiner

U.S. Cl. X.R.

105—26; 180—111